United States Patent [19]
Bagheri et al.

[11] 3,784,435
[45] Jan. 8, 1974

[54] METHOD OF FORMING PATCH-TYPE SELF-LOCKING SCREW FASTENERS

[75] Inventors: Mansour A. H. Bagheri, Downey; Walter P. Fitzgerald, Jr.; Beatrix Y. Sanders, both of San Diego, all of Calif.

[73] Assignee: Long-Lok Fasteners Corporation, Cincinnati, Ohio

[22] Filed: Feb. 14, 1972

[21] Appl. No.: 226,147

Related U.S. Application Data

[63] Continuation-in-part of Ser. No. 126,882, April 19, 1971, abandoned, which is a continuation-in-part of Ser. No. 36,960, May 13, 1970, abandoned.

[52] U.S. Cl. ............ 156/293, 151/7, 156/242, 156/250, 156/306, 156/322, 264/259
[51] Int. Cl. .............................................. B32b 31/26
[58] Field of Search .............. 151/7; 156/91, 242, 156/250, 293, 306, 311, 322; 264/259, 267

[56] References Cited
UNITED STATES PATENTS
3,093,177   6/1963   Villo ........................................ 151/7
3,568,746   3/1971   Faroni ..................................... 151/7

Primary Examiner—William A. Powell
Attorney—George F. Smyth et al.

[57] ABSTRACT

Thermoplastic polymer locking elements are formed on threaded fasteners to provide a range of self-locking torque characteristics. The thermoplastic resins are of the type that crystallize during cooling from the molten state.

The crystallizable polymers are preferably applied in film form to preheated threaded fasteners. By correlation of the preheat temperature, the length of time during which the molten polymer is allowed to melt and flow onto the thread surfaces, and the rate of cooling of the assembly, the geometry of the locking element and the degree of crystallinity of the polymer are controlled.

58 Claims, 14 Drawing Figures

PATENTED JAN 8 1974 3,784,435

METHOD OF FORMING PATCH-TYPE SELF-LOCKING SCREW FASTENERS

CROSS-REFERENCES TO RELATED APPLICATIONS

This application is a continuation-in-part application of application Ser. No. 126,882, filed Apr. 19, 1971, which in turn is a continuation-in-part of application Ser. No. 36,960, filed May 13, 1970 both, now abandoned.

BACKGROUND OF THE INVENTION

I. Field of the Invention

This invention relates to fasteners and in particular to self-locking metal screw threaded fasteners for locking cooperation with a complementary screw thread of a complementary member, a locking element comprising thermoplastic polymer being provided on the screw thread of the fasteners.

II. Description of the Prior Art

Villo U.S. Pat. No. 3,093,177 teaches that a patch for self-locking action may be formed on a bolt by degreasing the bolt in a hot alkali bath; locking the bolt in a special jig and heating the assembly to 475° F; applying a shaped pellet of polyamide resin (nylon) to the heated bolt under a pressure of 100 psi; cooling the bolt to 350° F while the plastic is under pressure; removing the pressure and then permitting the bolt to cool to room temperature.

Preziosi U.S. Pat. No. 3,294,139 also teaches that a screw fastener may be provided with a patch made of thermoplastic, such as nylon. The thermoplastic resin is applied to the fastener in powder form and then the fastener is heated sufficiently to melt the resin.

One disadvantage of the Preziosi patch-type threaded fasteners lies in the difficulty of obtaining close control over the thickness of the patch and, therefore, in a given production run of the fasteners, the patches vary widely in thickness. This fact may be verified by selecting a number of prior art patch bolts, the external screw threads of which are identical, within a narrow tolerance range of dimensions and screwing the bolts into nuts having internal screw threads that also lie in a narrow tolerance range of dimensions. With variations in the dimensions of the mating screw threads substantially eliminated in this manner, variations in the breakaway torques through repeated cycles must be caused by variation in the thickness of the plastic patches, and it is found that the breakaway torques do vary over a wide range.

Both of the two prior art procedures for forming patches on fasteners require careful preparation of the metal surfaces of the fasteners to insure effective bonding of the plastic and, of course, such preparation steps increase the cost of production. In the Preziosi disclosure the metal is first cleaned by dipping in an acid solution and subsequently the fastener is preheated to drive off moisture. In the Villo disclosure, a bolt is given a preliminary alkali wash and if the bolt is to be cadmium plated after the patch is applied, the bolt must not only be treated with hot alkali but also must be pickled, rinsed, electro cleaned, rinsed again and finally dried before the patch is applied. Obviously these additional operations greatly increase the cost of the patch bolts, but the disclosures stress their importance in obtaining the necessary bond between the metal and the polymer patch.

Since both of the prior art disclosures require that the fastener be cleaned before the plastic material is applied, it would seem to be economical to degrease and/or otherwise clean large masses of the fastener in advance. Unfortunately, however, pre-cleaned fasteners are highly vulnerable to corrosion so that storing and handling the pre-cleaned fasteners in advance of applying the plastic patches results in deterioration of the metal surfaces to which the plastic is to be bonded.

Both of the above prior art patents disclose the patch material as extending from the root of the screw thread substantially beyond the crest, the crest being completely submerged. Thus the locking action is achieved by causing a mating complementary screw thread to penetrate relatively deeply into the patch to develop an extensive area of metal-to-plastic pressure contact to achieve adequate frictional resistance to loosening rotation between the two screw threads. Such drastic deformation of the plastic patch reduces the capability of the fastener for repeated use without excessive drop in the breakaway torque. The protruding patch can also interfere with the insertion of the bolt into a close clearance hole.

Duffy U.S. Pat. No. 3,498,352 discloses the application of a polyamide or polyester patch on a threaded fastener by first applying an adhesive to the area of the fastener over which the patch is to be formed. Thereafter, the fastener is heated and powdered plastic is spread over the adhesive to form the desired patch. The primary disadvantage of this method is that it requires the use of an intermediate adhesive layer with its attendant higher cost and difficulty of application.

The preferred thermoplastics in the teachings of prior art patents are varieties of polyamide resins, with emphasis on Nylon 11 and Nylon 33, and in commercial practice these two resins are used almost exclusively.

Even those thermoplastic materials which have been utilized by the prior art in preparing patch-type fasteners tend to undergo some degree of crystallization during normal cooling from a molten state to room temperature and sustain a crystallization shrinkage of as high as 3 or 4 percent by volume. This crystallization shrinkage weakens the bond between the metal fastener and the patch material at the metal-to-plastic interface. This results in weakening of the bond between the plastic patch and the metal fastener which can result in premature failure of the fastener.

It would be desirable to improve the properties of patch-type fasteners of the prior art by providing a means to improve the bond between the plastic patch material and the metallic fastener element. Further, it would be desirable to provide a fastener in which the bond between the plastic patch material and the metallic fastener element and the properties of the patch material are improved by controlling the degree of crystallization that occurs in the patch material.

In addition, it would be desirable to provide both patch-type fasteners and a method for their manufacture in which the patch material is a crystallizable thermoplastic polymer having a higher shrinkage due to crystallization on cooling from a molten state to room temperature. Many of these thermoplastic polymeric materials have physical properties which are superior to those of thermoplastic materials used by the prior art in forming self-locking patch-type fasteners. However, they have been unsuitable for patch-type fasteners,

SUMMARY OF THE INVENTION

This invention pertains to a self-locking patch-type fastener in which a patch of a crystallizable thermoplastic polymer is adherently bonded to the metal fastener element.

In carrying out the method of the present invention, a metal fastener element having a molten crystallizable thermoplastic polymer in contact therewith is cooled at a controlled rate from a temperature of about the melting point or higher of the polymeric material to a temperature below the glass transition temperature of the polymeric material. The cooling rate employed is sufficient to reduce crystallization of the polymeric material to a crystallization shrinkage of about 25 percent or less of the polymer's maximum crystallization volumetric shrinkage. The crystallizable thermoplastic polymeric material is preferably applied to the fastener in the form of a film. Most preferably, the polymeric material is a poly (alkylene) phthalate as exemplified by the material Mylar A, a Trademark of E. I. DuPont de Nemours Company. When the polymeric material is applied in the form of a film, it is preferably curved laterally to the peripheral curvature of the fastener and pressed against the fastener to cause the screw thread of the fastener to penetrate the film sufficiently to fix the position of the film relative to the fastener such that the material of the film melts and flows into the valleys of the screw thread of the fastener. The film may be either pressed against the upper side of the fastener while in a reclining position such that gravity promotes the spreading of the melted polymer circumferentially of the fastener or may be pressed against the under side of the fastener such that gravity opposes the tendency of the melted polymer to spread circumferentially of the fastener. In the latter case, the width of the polymeric locking element is narrowed and tends to increase in thickness along its longitudinal midline.

In applying work-shaping pressure against the flat ribbon of the polymeric material, the ribbon is preferably held relative to the threads of the fastener for a time sufficient to cause the heated crests of the threads engaging the ribbon to sever the ribbon into discreet segments. As a result of the severing of the ribbon into discreet segments, accurately predetermined quantities of the polymeric material are formed by the discreet segments which melt and flow into the valleys between adjacent crests of the threads. The polymeric material then bonds to adjacent flanks of the threads to form a unitary cohesive patch of solid material bonded to the threads of the fastener at the preselected locations thereof. The flat ribbon of the thermoplastic polymeric material will have a predetermined length and a width which is preferably less than 90° of the circumferential extent relative to the threads of the fastener.

The maximum volumetric shrinkage which occurs in crystallizable thermoplastic polymers due to the crystallization of a particular polymer are known values which are reported in literature. Thus, in describing the controlled degree of crystallinity of the polymeric patch material obtainable in accord with one aspect of our invention, reference is made to the degree of crystallization of the polymeric patch material in terms of a percentage of the maximum crystallization shrinkage for the polymer. Crystals form in a crystallizable thermoplastic polymer within the temperature range between the melting point of the polymer and the glass transition of the polymer. By controlling the cooling rate in accord with one aspect of the present invention, the polymer in cooling from the temperature of about its melting point to a temperature below its glass transition temperature is cooled at a rate sufficient to reduce the crystallization to a crystallization shrinkage of about 25 percent or less of the polymer's maximum crystallization shrinkage expressed in terms of volumetric shrinkage. The melting point of the crystallizable thermoplastic polymer, its glass transition temperature, and its crystallization shrinkage, expressed as a percentage of the maximum crystallization shrinkage of the polymer, can be readily determined by known test methods. Thus, the control of crystallization of the polymeric material is accurately and conveniently expressed in the present specification in terms of the crystallization shrinkage of the polymer as a percentage of the polymer's maximum crystallization shrinkage.

Preferably, the crystallizable thermoplastic polymer is applied to a heated metallic fastener element and the heat of the element is utilized in melting the thermoplastic polymer. By controlling the temperature of the heated fastener element and the time during which the polymer is permitted to flow due to the heat from the metallic element (termed the prequench time), the thickness of the polymer on the element and its degree of spreading relative to the peripheral surface of the element may be controlled. These factors have an effect upon the torque characteristics of the finished fastener and, thus, may be varied to control the characteristics of the fastener.

Many thermoplastic polymers are found to develop bubbles in various degrees when heated to a molten state. The presence of these bubbles may be controlled, to some extent, in the present process. For example, if the temperature of the polymer is increased, the buoyancy and exit rate of the bubbles will also be increased. Also, by extending the prequench time, more time can be permitted to allow escape of the bubbles. If desired, the bubbles can be retained within the polymer to give it a more cellular or spongy texture and an increased resiliency.

In accord with one aspect of the present invention, the characteristics of either a male or female threaded fastener having a polymeric patch thereon may be controlled by control of the characteristics of the patch material. By heating of the metallic fastener element prior to application thereto of the polymeric material, an adherent bond is obtained even-though the fastener element is not cleaned or degreased prior to heating.

In addition to providing novel methods, the present invention provides novel fasteners in which a crystallizable thermoplastic polymeric patch material is adherently bonded to the metal fastener element. The degree of crystallization of the polymeric patch material is controlled at a level about 25 percent or less of the maximum crystallization shrinkage of the polymer. Due to the reduced crystallization of the polymer, the bond between the patch material and the metallic fastener element is more adherent and the physical properties of the patch are improved in terms of the performance properties of the finished fastener.

A wide variety of crystallizable polymers may be employed as the patch material. In one aspect of the present invention, in which the degree of crystallization of the patch material is controlled through controlled cooling, the crystallization rate of the polymeric patch material is less than that of polyethylene. Polyethylene crystallizes quite rapidly so that it is very difficult to control the degree of crystallization of this material by control of its cooling rate from a molten state to a temperature below its glass transition temperature.

As an illustration of the crystallizable thermoplastic polymers that may be employed as the patch material in accord with the present invention, there are the poly(alkylene phthalates), including the poly(alkylene terephthalates) and poly(alkylene isophthalates).

Other thermoplastic polyester resins which may be employed as patch material include poly(alkylene alicyclic-alkylene phthalates); polyesters formed from the copolymerization of an aryl diol and an aliphatic dicarboxylic acid; polyesters formed from the copolymerization of diaryl diol and an aryl dicarboxylic caid, alkyl acyl polyesters, such as poly(glycollic ester).

Other exemplary classes include vinyl polymers and copolymers thereof such as poly(vinyl chloride), poly(vinylidene chloride), poly(vinyl fluoride) and poly(vinylidene fluoride); polypropylene and other polyolefins; ionomers, such as Surlyn-A (DuPont Trademark); acrylics, such as poly(acrylonitrile) and its copolymers with vinyl chloride and vinylidene chloride; acrylic ester polymers such as poly(methyl methacrylate); poly(chlorotrifluoroethylene); poly(tetrafluoroethylene); polyamides, such as Nylon 66, Nylon 6, Nylon 610, Nylon 612, Nylon 11 and others; polycarbonates, such as those based on bisphenol A; poly (phenylene oxide); polysulfones, such as polyether sulfones, and acetal resins, such as Delrin 500, a DuPont Trademark.

To still further exemplify various representative polymeric materials which may be employed in the practice of the present invention, there are the poly(alkylene phthalates) having the general formula wherein $x$ is an integer from 2 to 10, $n$ is an integer of a magnitude sufficient to produce a molecular weight of at least about 10,000, and Ar is . Such poly(alkylene phthalates) include the poly(alkylene terephthalates) and poly (alkylene isophthalates). These poly(alkylene phthalates) provide exceptional adhesion to the threaded fastener surfaces and produce a lower percent reduction in breakaway torque after, e.g., 15 cycles, than comparable polyamide and polycarbonate patches. Within this family, it is presently preferred to employ poly(ethylene terephthalate) because of its low cost and availability — particularly its availability in film form.

Other thermoplastic polyester resins which may be employed as the patch material include the following: poly (alkylene alicyclic-alkylene phthalates) having the general formula such as poly(1,4-cyclohexanedicarbinyl-terephthalate); polyesters formed from the copolymerization of an aryl diol and an aliphatic dicarboxylic acid and having the general formula such as poly(1,4-phenylene adipate); polyesters formed from the copolymerization of a diaryl diol and an aryl dicarboxylic acid and having the general formula such as poly 2,2-propane bis (4-phenyl-isophthalate-co-terephtha-late) (50/50); alkyl acyl polyesters, such as poly(glycollic ester), having the general formula and aryl acyl polyesters, such as poly(1,4-benzoic ester), having the general formula In each of the foregoing general formulae, $x$ is an integer from 2 to 10, Ar = and lower alkyl- and halogen-substituted derivatives thereof, Al = alicyclic such as 1,4-cyclohexane, and A = $CH_2$, $C(CH_3)_2$, O or $SO_2$. Also, $n$ is an integer such that the molecular weight is at least 10,000.

Lower alkyl groups, as included in the above formulae may typically contain, for example, from one to about six carbon atoms while alicyclic groups, for example, may typically contain, from about five to about 12 carbon atoms. Aromatic groups, as exemplified by Ar in the above formulae, may typically contain from about six to about 18 carbon atoms.

BRIEF DESCRIPTION OF THE DRAWINGS

The features and advantages of the invention may be understood from the following detailed descriptions and the accompanying drawings.

In the drawings, which are to be regarded as merely illustrative.

DESCRIPTION OF THE PREFERRED EMBODIMENTS

The methods employed to apply the aforedescribed polymers to a threaded fastener will now be more specifically described. Firstly, with respect to the formation of a patch from crystallizable polymer resin, the threaded fastener is heated to a temperature sufficient to melt the polymer resin when the latter is applied to the fastener. However, the temperature of the threaded fastener is maintained below a temperature which would decompose or char the polymer resin when placed thereon. Preferably, the threaded fastener is heated to a temperature above the melting temperature of the polymer such that all of the polymer resin melts relatively rapidly to facilitate formation of a substantially uniform patch from end-to-end. As a general rule, the higher the temperature of the molten polymer, short of decomposition, the lower its viscosity and the more completely it will flow into the surface imperfections of the metal substrate to give maximum bond upon solidifying.

The application temperature determines the rate of melting and the rate at which the molten polymer flows into the threads and circumferentially on the fastener. In this respect, it is a factor in determining the self-locking torque characteristics that the finished patch will develop. The choice of temperature is governed, to some extent, by the mass of the fastener being produced; small fasteners cool more rapidly than large ones, so higher application temperatures can be used to insure that the polymer remains molten for the time required to attain the required extent of circumferential flow.

Usually, the threaded fastener is heated to a temperature about 100° to 300° F. above the melting temperature of the polymer resin. Prior to heating the threaded fastener, it may be degreased with a suitable solvent such as carbon tetrachloride and/or it may be grit blasted using, e.g., powdered alumina. However, these steps are not necessary, although some enhancement may be obtained, since the temperature to which the fastener is heated (generally 700° F to 850° F) is generally sufficient to thermally degrease the threaded fastener.

After the threaded fastener is brought to the desired temperature, the thermoplastic polymer is applied to the fastener so that it extends longitudinally across a plurality of threads. This may be accomplished by applying the polymer in film, powder or even liquid form to the threaded fastener. If the polymer is applied in film form, as is presently preferred, it is so applied to the threads of a fastener with the aid of work-shaping pressure. The latter generally conforms the film to the curvature of the threaded fastener and applies some pressure to the film to force it into heat-transfer contact with the threads over substantially its entire length. The result of using work-shaping pressure is that the film is applied to the desired location on the fastener, is oriented in the desired direction, and melts substantially uniformly along its length without, for example, its edges curling inwards.

If the thermoplastic polymer is applied to the threaded fastener in powder or liquid form, suitable means may be employed to govern the flow of the polymer onto the fastener. For example, a metering device may be attached to an eye-dropper-like feeder tube having an exit end movable with respect to the fastener (e.g., by passing the fastener on a conveyor belt past the tube's end). The metering device can be governed to start and stop polymer powder or fluid moving through the feeder tube so that it is deposited in the desired amount and in the desired place on the threaded fastener.

The amount or thickness of the polymer material deposited on the threaded fastener is primarily a matter of choice, with the installation torque and breakaway torque generally increasing as the patch thickness increases. If the patch is too thick relative to the spacing available between male and female threaded members, the excess thickness is merely removed by the female member as the latter is threaded onto the male member. The remaining patch material continues to function effectively. In practice, the thickness of the patch will usually depend upon the size of the threaded fasteners and, particularly, upon the tolerances between male and female fasteners, as hereinafter explained.

As previously noted, it is preferred to employ the thermoplastic polymer in film form, because this provides excellent and convenient control over the geometry of the patch. Torque tests have demonstrated that the patch dimensions are highly repeatable using film as compared with using other forms such as powder. Use of the latter often results in substantially different thickness profiles across the width of the patch from one patch to another.

After the thermoplastic polymer material has been applied to the heated threaded fastener, it melts and flows into the valleys between the threads and is allowed to flow around the circumference of the fastener unti it attains the width and the thickness required. At this point, it must be cooled below its melting point to preserve the requisite patch geometry. The period between application of the polymer to the heated fastener and the cooling or quenching step is hereinafter referred to as the prequench time. If necessary to obtain the desired geometry of patch, supplementary heating can be provided during the prequench time to insure that the polymer remains molten.

As will be more fully explained hereinafter, by choice of combination of application temperature, prequench time and size and thickness of polymer film used, and by practicing the process of the present invention, a given crystallizable polymer can be utilized to produce consistently any desired self-locking prevailing torque values from a designated range. The three variables can be regulated to compensate for each other, thereby accommodating useful changes that would facilitate the manufacture of self-locking threaded fasteners. As an example, a polymer film ¼ × ½ × 0.014 inch can be applied to a ⅜ inch SAE bolt to produce any level of breakaway torque desired between 20 and 150 inch-lbs by varying the temperature history; using a modified temperature history of application temperature and prequench time, a polymer film ⅛ × ½ × 0.028 inch can be made to give torque values identical to those of the thinner film. Either film size can be made to give identical torque values on a loose fitting nut/bolt combination as on a close-fitting one. Within reasonable limits, one size of film can be made to produce the same torque for a large bolt as for a small. In addition to such versatility, the process makes possible close control and reproducibility in the manufacture of self-locking threaded fasteners by its economical simplicity and flexibility.

Heretofore, the length of prequench time has been pragmatically determined by the requirements for melting and consolidating the discrete particles of polymer powder, or to soften and press out a thick pellet. The application temperatures used are not usually much above the melt temperature of the polymer. The degree of crystallinity attained and therefore the torque characteristics imparted to the threaded fastener, are significantly effected by the rate of cooling. Failure to control the cooling rate results in variations in the quality of the finished patch.

By contrast, controlled cooling is made to serve several important functions in the process of this invention. Controlled cooling converts the amorphous, molten crystallizable polymer to a substantially amorphous solid; that is, it reduces the degree of crystallization that would cause shrinkage in the polymer and disruption or loss of polymer-metal bonding. Additionally, controlled cooling terminates the flow of molten polymer around the circumference of the fastener when the patch has attained the specified width and thickness.

In practicing the process of the present invention, a metallic fastener element having a crystallizable thermoplastic polymer in contact therewith is cooled at a controlled rate from a temperature of about the melting point or higher of the polymer to a temperature below the glass transition temperature of the polymer. The polymer is one which has a rate of crystallization less than that of polyethylene. Polyethylene has a rate of crystallization that is so rapid that its crystallization cannot be effectively controlled by control of its cooling rate from a molten state. Thus, the present invention does not include the use of polyethylene as a patch material.

During cooling of a thermoplastic crystallizable polymer from a molten to a solid state, there is a shrinkage of the polymer due to thermal contraction which may vary, depending on the particular polymer, from about 2 to about 5 percent by volume. Also, there is a shrinkage due to crystallization which is termed crystallization shrinkage. The process of the present invention does not alter the thermal contraction of the polymeric patch material or the thermal contraction of the metal fastener element. However, the process substantially reduces the degree of crystallization of the polymer which results in a substantial reduction in the crystallization shrinkage of the polymeric patch material.

While not bound by any theory, it is believed that during crystallization of a polymeric patch the polymer in forming a more ordered state of matter pulls away from the metal surface, thereby decreasing the strength of the polymer to metal bond. Also, the polymer generally becomes more brittle and undergoes crystallization shrinkage.

In defining the control of crystallization of the polymeric patch material obtainable by the present method, reference is made to the reduction of the crystallization shrinkage of the polymer in order to conveniently define the degree of crystallization of the polymer. However, this is not meant to imply that the mechanism by which the present process functions in controlling the properties of the patch material and the properties of the finished self-locking fastener involves merely a control of shrinkage.

Crystallization of a polymer occurs as the polymer cools through the temperature range from its melting point to its glass transition temperature. The values of maximum crystallization shrinkage for polymers are known values which are reported in the literature for the various crystallizable thermoplastic polymers. In accord with the present invention, the cooling rate employed is sufficient to reduce the crystallization of the polymer in cooling from its melting point to its glass transition temperature to a crystallization shrinkage of about 25 percent or less of the maximum crystallization shrinkage of the polymer expressed as a volumetric shrinkage. The volumetric shrinkage of the polymer may be determined by ASTM Procedure D–1505–68 entitled "Density of Plastics by the Density Gradient Technique." To determine the crystallization shrinkage, the thermal contraction shrinkage is substracted from the total volumetric shrinkage. The melting point of the thermoplastic polymer may be determined by ASTM Procedure D–2117–64 entitled "Melting Point of Semicrystalline Polymers," and the glass transition temperature may be determined by ASTM Procedure D–696–70 entitled "Coefficient of Linear Thermal Expansion of Plastics." In the latter procedure, the glass transition temperature is determined by observing the temperature at which the coefficient of linear thermal expansion increases sharply.

The rate of cooling of the hot fastener and its polymer patch is controlled by the temperature of the cooling medium. Water is a convenient and economical medium for the range of 32° F. to 212° F. For very rapid cooling, as for fasteners of large mass and sensible heat, silicone oil cooled by dry ice can be used.

Controlled cooling, as described, produces crystallizable polymer patches which have excellent adherence to the fastener surface and are resilient so that they can be re-used and so that they seal with mating threaded surfaces. In contrast, if a controlled cooling step is not employed, the resulting patch adherence to the fastener is substantially reduced which may be sufficient to make the patch commercially unsuitable.

The herein-described crystallizable polymer patches may be used on cadmium-plated fasteners. However, to obtain commercially useful results, the cadmium must be plated on the fasteners after the patch is applied. That is, the patch is applied to a plain threaded fastener, e.g., of carbon steel, as described and, thereafter, cadmium is plated on the fastener by well-known techniques.

Figure 1:
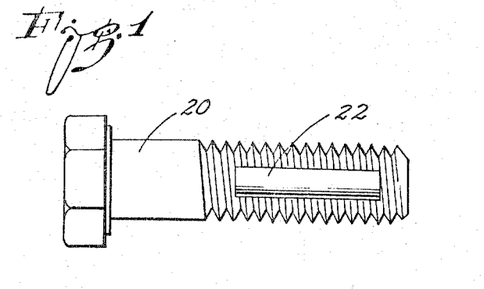
FIG. 1 is a plan view of a highly heated metal screw fastener showing a plastic blank deposited thereon in preparation for the formation of a patch on the fastener.

Referring now to the drawings and more specifically to FIGS. 1 to 7, a screw-threaded fastener, for example, a bolt 20 shown in FIG. 1 is heated as heretofore stated to a temperature above the melting point of the thermoplastic polymer and then a blank 22 of the polymer of a desired thickness and configuration is positioned longitudinally of the bolt on the threaded portion of the bolt.

Figure 2:
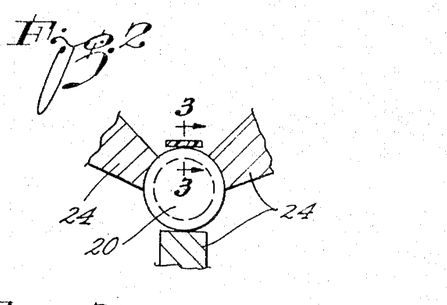
FIG. 2 is a sectional view showing how the heated metal fastener with the plastic blank thereon shown in FIG. 1 is immobilized by clamping means that makes contact with the screw fastener at three circumferentially spaced points.

Preferably the polymer is a poly(alkylene phthalate), e.g., "Mylar A," a Trademark of DuPont, which melts at approximately 480° F. and the bolt is heated to a temperature that is substantially above 500° F. A preferred range is about 600° to about 850° F. The plastic material illustrated is in the form of a strip or tape that is one-fourth inch wide and has a thickness of approximately 0.014 inch. Referring to FIGS. 1 and 2 the plastic blank is an increment of the tape approximately five-eighths inch long which is simply deposited on the screw thread of the heated fastener, the leading end of the blank being preferably spaced from the leading end of the screw thread of the bolt by at least two turns of the screw thread. FIG. 2 shows how the bolt 20 is initially immobilized by three clamp elements 24 which grip the bolt at three circumferentially spaced points.

Figure 3:
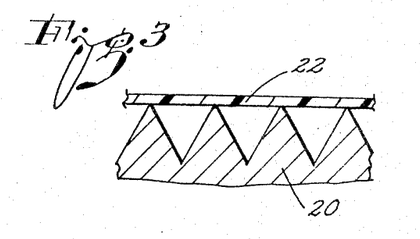
FIG. 3 is an enlarged section along the line 3—3 of FIG. 2 showing how the newly deposited plastic blank rests on the screw thread of the fastener before heat transfer from the screw thread to the plastic blank has had an opportunity to soften the material of the blank.
Figure 4:
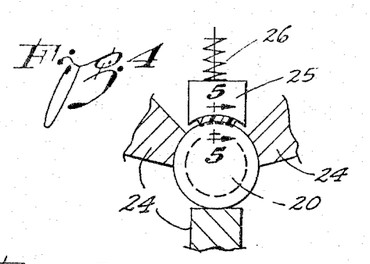
FIG. 4 is a sectional view similar to FIG. 2 showing how a pressure shoe is momentarily applied to the newly deposited plastic blank to form the plastic blank to the transverse curvature of the screw fastener and to cause the curved blank to be tacked to the fastener by slight penetration of the under side of the blank by the crests of the screw thread of the fastener.
Figure 5:
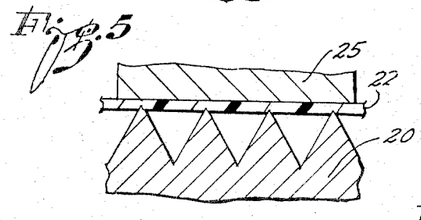
FIG. 5 is a longitudinal sectional view of an enlarged scale along the line 5—5 of FIG. 4 showing the initial penetration of the plastic material by the crests of the screw thread which results from the momentary pressure applied to the plastic blank.

In the brief time interval before the high temperature of the bolt has had time to appreciably affect the plastic material, the blank 22 simply rests on the crests of the screw as shown in FIGS. 2 and 3. Immediately after the blank is deposited on the screw thread of the fastener, however, a pressure shoe 25 under the pressure of suitable spring means 26 (FIG. 4) makes momentary contact with the plastic blank 22 for the dual purpose of forming the blank transversely to the curvature of the bolt and of applying sufficient momentary pressure to "tack" the plastic blank to the bolt. The pressure of the shoe 25 against the blank is not sufficient to cause the crests of the screw threads to sever the blank into discrete sections but the applied pressure is sufficient to cause initial penetration of the crests of the screw thread (as shown in FIG. 5) because the highly heated crests melt the under side of the plastic blank locally along the region of each crest. The pressure of the pressure shoe 25 may have a duration of approximately 1 second.

It is characteristic of poly(alkylene) phthalate plastics that when the plastic is melted it adheres tenaciously to a highly heated metal surface. Thus when the pressure shoe 25 is retracted from the position shown in FIG. 5 the plastic blank is tacked to the bolt because of the adherence of the blank to the crests of the screw thread. It is important to note that the adherence is sufficient to keep the largely solid blank shaped to the curved cross-section of the bolt after the pressure shoe is retracted so that the transfer of heat from the bolt to the blank occurs effectively at the opposite longitudinal edges of the blank as well as along the longitudinal midline of the blank.

Figure 6:
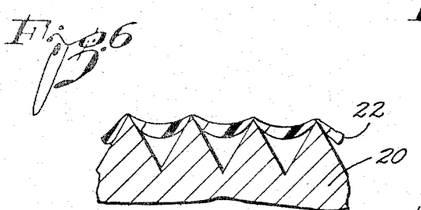
FIG. 6 is a fragmentary longitudinal sectional view similar to FIG. 5 with the pressure shoe withdrawn and showing the initial sagging of the plastic blank into the regions of the valleys of the screw thread.
Figures 7, 10:
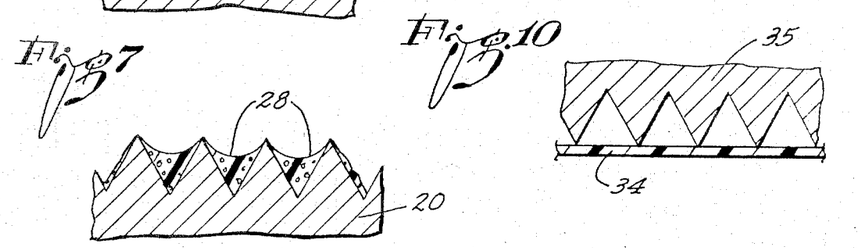
FIG. 7 is a sectional view similar to FIG. 6 showing the end result of the melting and fusing period wherein the completely fused plastic material forms pools in the bottoms of the valleys of the screw thread.
FIG. 10 is an enlarged cross section as taken along the line 10—10 of FIG. 9 showing the screw thread of the metal fastener resting on the plastic blank before sufficient heat transfer occurs from the fastener to the blank to appreciably melt the blank.

The prequench period begins with the initial penetration of the blank by the screw thread shown in FIG. 5 and continues after the retraction of the pressure shoe, until the plastic material of the blank is completely melted. Initially, as shown in FIG. 6, the softened blank sags into the regions of the valleys of the screw thread but when the plastic material is completely melted it forms pools 28 on the bottoms of the valleys of the screw thread as shown in FIG. 7 because of a surface tension phenomenon which causes the melted plastic to aggressively wet the metal of the fastener.

If the pressure shoe 25 is not applied to the blank 22 at the beginning of the prequench period, the newly deposited blank may tend to bow longitudinally so that the melting starts at the opposite ends of the blank. If the pressure shoe 25 is not used the blank does not immediately conform to the cross-sectional curvature of the bolt with the result that melting of the blank along its opposite longitudinal edges is delayed. With the pressure step omitted, the blank is not tacked to the heated bolt and may be free to squirm out of longitudinal alignment with the bolt and to curl away from the bolt. When the blank is not tacked to the bolt, the initial longitudinal bowing of the blank may cause uneven distribution of the melted plastic among the valleys of the screw thread, there being less melted plastic in the valleys near the opposite ends of the blank than in the valleys in the central region of the blank.

In the prequench period bubbles can be seen in the melted plastic and at least some of these bubbles as viewed under a microscope appear to be relatively large. At the end of the prequench period, however, the larger bubbles disappear but a relatively large number of small, less buoyant bubbles remain entrapped within the melted plastic.

The prequench period is terminated by controlled cooling of the heated fastener with the melted plastic thereon. In the preferred practice of the invention the controlled cooling is accomplished by quenching the heated fastener in water.

If the bolt is permitted to cool too slowly, the resultant patch is crystallized and will take on a murky or white color. The plastic is then relatively hard and brittle, and the bond between the plastic and the bolt is reduced in strength. In contrast, the controlled cooling of the plastic material results in a patch that is more clear with the patch having a desirable degree of resilience and adhering more tenaciously to the fastener.

In general, the duration of the prequench period varies inversely with the diameter of the screw fastener because the greater metal mass-to-surface ratio results in a slower heat loss rate in a given environment. The required duration of the prequench period also varies inversely with the temperature to which the fastener is initially heated.

The sensible, or stored, heat of the fastener depends on its mass and the selected temperature to which it is heated prior to applying the polymer patch. From an initial temperature of 700° F., cooling in 70° F. air, a ⅛ × 1 inch fastener will cool to 480° F. (the melting point of Mylar A) in approximately 50 seconds, a ⅜ × 1 inch fastener will require 135 seconds and a ½ × 1 inch fastener will require 200 seconds. A polymer film of 0.014 inch thickness by 0.25 inch width flows out to 0.4 inch width in 30 seconds on a ⅜ × 1 inch bolt, and in 25 seconds on a ½ inch bolt, if both are heated to 700° F. Since the thread depth of the ½ inch bolt is greater than for the ⅜ inch bolt, the torque levels obtained from the ½ inch bolt would be lower than on the ⅜ inch bolt for such identically sized patches. The torques would be substantially equal if the prequench time for the ½ inch bolt were reduced to 18 to 20 seconds since this would result in a thicker, narrower patch. In any case, controlled cooling of the assembly results in the polymer being resilient and substantially amorphous (i.e., having a reduced degree of crystallinity). However, if the bolts are heated to only 600° to 610°F., the times required for polymer flow to produce equal torque values will be increased, e.g., to 45 and 30 seconds respectively. In both such cases, but particularly for the ⅜ inch bolt, the longer prequench times permits cooling in air to a lower temperature prior to quenching and the amount of crystallization is increased.

A screw fastener of small diameter may not store enough heat to melt and flow the plastic material as quickly as desired, and, in that event, heat may be applied during the prequench period to a small fastener to maintain the molten state of the polymer for the selected duration of the prequench period.

In a number of test runs, the Mylar A sheet material was employed in various thicknesses of approximately 0.005 inch, 0.0010 inch, 0.015 inch and 0.020 inch, with the patches being applied to class 2A ¼ × 16 inch bolts in the manner indicated in FIGS. 1–7. It was found that a blank of a thickness of 0.010 inch resulted in sufficient plastic in the valleys of the screw thread to provide a desirable self-locking effect.

In all of the above tests the breakaway torque was higher than 7 inch-pounds on the 15th cycle. In one test run, Mylar blanks of approximately 0.010 inch thickness were applied to the bolts that were cleaned in advance either by sandblasting or by dipping the bolts in a suitable degreasing agent such as carbon tetrachloride. The results were excellent but it was found that the results were also excellent if the bolts were taken from stock in the usual oily state and simply heated to the desired temperature without any pre-treatment. This was so, even when the heating step created an oxide coating on the metal surfaces.

A series of comparative tests to measure the effect on torque characteristics of varying the process parameters was conducted on ⅜ × 16 UNC2A × 1 inch hex head, SAE Grade 5 cap screws, plain finished, selected for uniformity of size. The test nuts employed were first burnished, then gauged to insure uniformity of thread diameter, case hardened by heat treatment, and re-gauged.

Mylar A tape of dimensions ¾ × ¼ × 0.014 inch was used as the blank in all tests. The tapes were positioned with their ¾ inch length disposed lengthwise on the fastener.

The following data was obtained from tests in which the bolts were preheated to 700° F., and the quenching medium was water at 70° F. The prequench times, at a 70° F. air temperature, were varied as indicated. The penetrometer hardness values are in units of 0.0001 inch penetration and the test device was a modified Lab-Line Penetrometer.

| Prequench time, secs. | Installation torque in-lbs. | Removal cycles, breakaway torque, in-lbs. | | | | | | | Penetrometer hardness |
|---|---|---|---|---|---|---|---|---|---|
| | | 1 | 2 | 3 | 4 | 5 | 10 | 15 | |
| 15 | 109 | 116 | 81 | 68 | 59 | 55 | 35 | 25 | 34 |
| 30 | 98 | 98 | 73 | 61 | 55 | 50 | 30 | 25 | 32 |
| 45 | 96 | 97 | 71 | 59 | 55 | 48 | 30 | 25 | 20 |
| 60 | 77 | 85 | 53 | 47 | 43 | 40 | 33 | 29 | 17 |
| 120 | 113 | 92 | 60 | 45 | 45 | 53 | 32 | 25 | 14 |
| 180 | 62 | 65 | 42 | 35 | 30 | 28 | 25 | 22 | 4 |

For the process conditions and bolt size employed in the above test, the Mylar A patch was found to begin crystallization after a prequench time of 135 seconds. Accordingly, the torque values for the 180 second prequench time show a marked drop at all cycles, indicating loss of durability.

The progression of melting of the Mylar A blank during the prequench periods in 70° F air environment is from the polymer-metal interface toward the polymer-air interface, and for the conditions of the test it was found that approximately 50 seconds was required to obtain complete melting of the polymer at the air surface. When this "skin" finally melts, the rate of circumferential flow and spreading of the polymer increases sharply. As a result of the more rapid thinning of the patch, the installation and first five removal torques are seen to have decreased markedly when the prequench time exceeded 45 seconds.

Rapid hardening of the patch occurs as the prequench time approached the start of visible crystallization at 135 seconds. Accordingly, for the 120-second prequench time, the installation and first removal torque values were high, but the torque performance beyond the second removal did not maintain the relatively high level because of the increased brittleness and loss of durability from hardening.

In a second test series, the bolts were preheated to 850° F. for the application of the patch, and using the same 70° F. water quenching medium the following results were obtained.

| Prequench time, secs. | Installation torque, in.-lbs. | Breakaway torque, in-lbs. removal cycles | | | | | | |
|---|---|---|---|---|---|---|---|---|
| | | 1 | 2 | 3 | 4 | 5 | 10 | 15 |
| 5 | 75 | 85 | 55 | 45 | 45 | 45 | 25 | 25 |
| 10 | 55 | 75 | 45 | 40 | 40 | 40 | 25 | 20 |
| 15 | 70 | 85 | 45 | 40 | 40 | 35 | 25 | 20 |
| 60 | 125 | 120 | 100 | 85 | 70 | 60 | 50 | 35 |
| 120 | 140 | 150 | 105 | 100 | 50 | 45 | 25 | 25 |
| 145 | 100 | 100 | 80 | 75 | 60 | 55 | 50 | 30 |
| 180 | 60 | 60 | 45 | 40 | 45 | 40 | 20 | 20 |

At the higher temperature of 850° F., the polymer blanks reached the molten state much more quickly than with a bolt temperature of 700° F. Consequently, the torque levels begin to decrease normally, since the patch thickness diminishes as the prequench time is increased. The onset of visible crystallization, in this case was about 140 seconds and produced the highest torque levels. However, as visible crystallization proceeds, the torque performance of the brittle patch declines sharply, as is characteristic of the crystallizable polymers.

To complete the comparison, a third test series was made wherein the bolts were heated to only 600° F. The following table shows the results.

| Prequench time, secs. at 600°F | Quench medium (temperature °F) | Installation torque, in.-lbs. | Breakaway torque, in-lbs. removal cycles | | | | | | |
|---|---|---|---|---|---|---|---|---|---|
| | | | 1 | 2 | 3 | 4 | 5 | 10 | 15 |
| 20 | 70° water | 225 | 200 | 150 | 100 | 80 | 75 | 65 | 50 |
| 20 | 70° air | 155 | 180 | 150 | 85 | 75 | 70 | 55 | 40 |
| 20 | 250° air | 210 | 175 | 150 | 85 | 70 | 65 | 50 | 35 |
| 60 | 70° water | 175 | 175 | 110 | 95 | 75 | 75 | 65 | 50 |
| 60 | 32° water | 175 | 180 | 150 | 125 | 120 | 100 | 80 | 75 |

For the 600° F. application temperature, the beginning of visible crystallization was at about 50 to 55 seconds after the blank was applied, and the previously discussed loss of torque, due to crystalline brittleness, was very evident at 120 seconds. Because of the slower melting and flowing rate at 600° F., compared to that of the higher application temperatures, the patches are thicker and the prevailing torque levels are higher for equal prequench times.

Nylon 66 (a Trademark of DuPont) blanks of dimensions ⅜ × ¼ × 0.020 inch were also tested using the same ⅜ × 16 UNC2A × 1 inch hex head SAE Grade 5 cap screws. The application temperature was 800° F., and because of the greater thickness of blank, the bolts were maintained in an environment of 600° F. heated air during the prequench period. Both 70° F. and 32° F. quenching water bath, and 70° F. and 250° F. air cooling were used in the test series, producing the following data.

The greater thickness of Nylon 66 blank used, compared to that of the Mylar A tested results in much higher torque levels, as would be expected. The Nylon 66 does not tend to crystallize as much as Mylar A. However, the advantage of reducing crystallization can be seen in the improved durability, or torque retention, obtained when ice water was used for maximum cooling rate in the above test.

| Prequench time, secs. | Installation torque, in.-lbs. | Breakaway torque, in-lbs. removal cycles | | | | | | |
|---|---|---|---|---|---|---|---|---|
| | | 1 | 2 | 3 | 4 | 5 | 10 | 15 |
| 15 | 130 | 160 | 120 | 95 | 85 | 75 | 60 | 45 |
| 30 | 150 | 150 | 115 | 95 | 85 | 70 | 60 | 45 |
| 45 | 155 | 150 | 120 | 95 | 85 | 75 | 65 | 50 |
| 120 | 90 | 110 | 65 | 60 | 55 | 50 | 40 | 35 |

Hardness measurements were made on patches of several crystallizable polymers that had been applied by various application temperatures, prequench times and quenching rates. A Lab-Line Penetrometer was modified to apply the higher-than-normal needle loading required for plastics, compared to asphalts. The readings are in increments of 0.0001 inch units, and are intended only to indicate relative hardness and the changes caused by the thermal history given the crystallizable polymers.

| Polymer | Application Temperature °F | Thermal History | Penetrometer |
|---|---|---|---|
| 66 Nylon | | As received | 15 |
| | 800 | 70° water quench | 18 |
| | 550 | 70° air cool | 2 |
| | 550 | 70° water quench | 8 |
| Polypropylene (Pro-Fax, a Trademark of Hercules) | | As received | 75 |
| | 450 | 70° water quench | 75 |
| | 450 | 70° air quench | 25–50 |
| | 450 | 32° water quench | 148 |
| Mylar A | | As received | 20 |
| | 800 | 70° water quench | 26 |
| | 700 | 70° water quench | 33 |
| | 600 | 70° water quench | 20 |
| | 6–800 | 70° air cool | 2–6 |

The lower penetrometer values in the above data are indicative of increased crystallization and hardness.

Hardness test covering a wide range of thermal treatments were conducted on Mylar A material as shown in the following table.

| Application temperature °F | Prequench time, secs. | Prequench temp 'F | Quench temp. 1F | Medium | Penetrometer 0.0001" |
|---|---|---|---|---|---|
| Mylar, as recieved, no temperature history | | | | | 20 |
| 850 | 15 | 525 | 32 | water | 24 |
| 850 | | 70° air cooled | | | 2 |
| 700 | 15 | 70 | 70 | water | 34 |
| 700 | 30 | 70 | 70 | water | 32 |
| 700 | 45 | 70 | 70 | water | 20 |
| 700 | 60 | 70 | 70 | water | 17 |
| 700 | 120 | 70 | 70 | water | 14 |
| 700 | 180 | 70 | 70 | water | 4 |
| 700 | | 70° air cooled | | | 4 |
| 600 | 15 | 70 | 70 | water | 20 |
| 550 | 15 | 550 | 32 | water | 25 |
| 550 | 45 | 70 | 32 | water | 8 |
| 550 | | 70° air cooled | | | 6 |

It can be seen from the hardness test data that the thermal history given a crystallizable polymer can be utilized to vary and control the mechanical properties of the polymer, specifically to make it significantly harder or softer than it is in virgin state. Thus for a patch of given dimensions, the self-locking torque levels attained by the threaded fastener can be varied by altering the hardness of the polymer.

An alternate procedure for forming a plastic patch on a metal screw fastener is illustrated by FIGS. 8–14. To carry out this procedure a pressure shoe employed to form the plastic strip to the curved configuration of the screw fastener is a metal cradle 30 having a longitudinal cavity 32 that conforms to the cross-sectional curvature of the lower half of the horizontal screw fastener.

Figure 8:
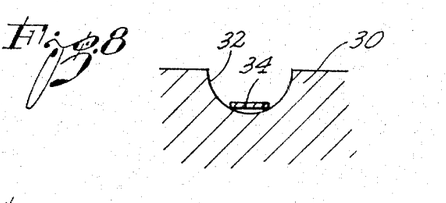
FIG. 8 is a fragmentary sectional view illustrating the first step of a procedure for applying a plastic patch to the under side of a horizontally positioned screw-threaded fastener, the view showing how a plastic strip is initially deposited in a relatively cool cradle which is to serve as means for shaping the plastic strip to the curvature of the fastener.
Figure 9:
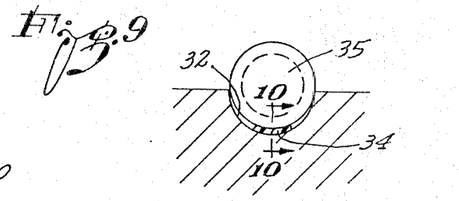
FIG. 9 is a cross-sectional view similar to FIG. 8 showing a highly heated screw-threaded fastener initially positioned in the cradle on top of the plastic strip.
Figure 12:
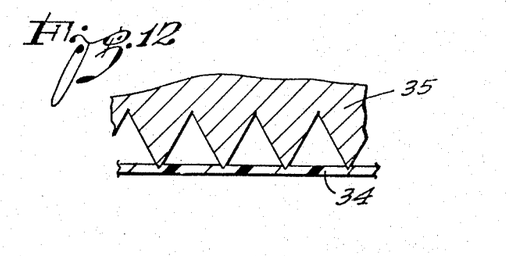
FIG. 12 is a longitudinal sectional view on an enlarged scale along the line 12—12 of FIG. 11 showing the initial penetration of the plastic material by the crests of the screw thread which results from the momentary pressure applied to the reclining fastener.

The first step is to deposit a plastic blank 34 in the bottom of the cavity 32 as indicated in FIG. 8 with the cradle at a temperature below the melting point of the plastic. The next step which is illustrated in FIG. 9 is to drop the heated screw fastener 35 into the cavity 32 onto the plastic blank 34. As shown in FIG. 10, the screw fastener initially rests on the plastic blank without appreciable penetration. Immediately, however, as the screw fastener 35 is placed under pressure of a momentary duration, such as one second, the plastic blank is tacked to the screw fastener by the crests of the screw thread of the fastener melting the plastic material and penetrating the plastic material to a degree such as indicated in FIG. 12.

Figure 11:
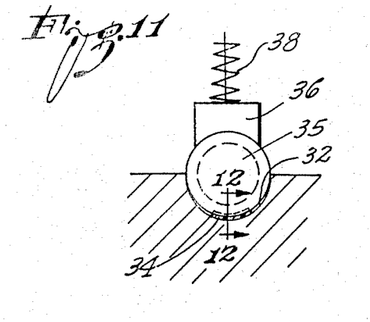
FIG. 11 is a similar cross-sectional view showing how a pressure shoe is momentarily applied to the reclining fastener to cause initial penetration of the plastic blank by the crests of the screw thread.
Figure 13:
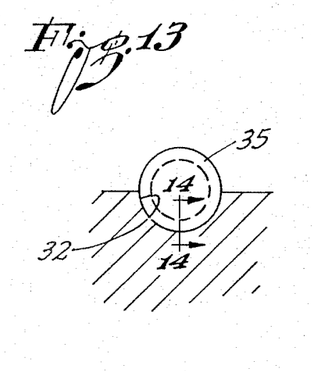
FIG. 13 is a cross-sectional view similar to FIG. 11 showing how the heated fastener sinks into the material of the plastic blank during the melting and fusing period that follows withdrawal of pressure from the fastener.

As shown in FIG. 11 the momentary pressure may be provided by a pressure member 36 which advances downward against the upper side of the reclining screw fastener under pressure provided by spring means 38. Since the plastic blank is largely solid, the heated fastener 35 is spaced from the bottom of the cavity 32 by the plastic blank 34 as may be seen in FIGS. 11 and 12. In the course of the ensuing prequench period the plastic blank is completely melted to permit the screw fastener 35 to sink to the bottom of the cavity 32 as indicated in FIG. 13.

Figure 14:
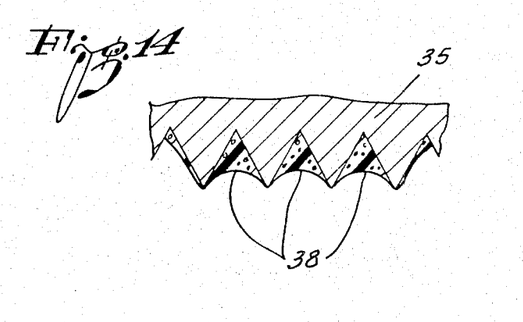
FIG. 14 is an enlarged section along the line 14—14 of FIG. 13 showing how the completely melted plastic on the under side of the reclining fastener has climbed upward into the valleys of the screw thread on the under side of the fastener at the end of the melting and fusing period.

Here again the completely melted plastic seeks the valleys of the screw thread by a surface tension phenomenom and FIG. 14 shows how the melted plastic forms pools 38 in the inverted valleys of the screw thread. It can be seen that FIG. 14 is substantially FIG. 7 turned upside down.

For a given bolt temperature and prequench time, there is a slight difference between the circumferential cross-sectional configuration of a patch produced by the first procedure illustrated by FIGS. 1–7 and the circumferential cross-sectional configuration of a patch produced by the second procedure illustrated by FIGS. 1–14. In the first procedure, gravity promotes the tendency of the melted plastic to spread circumferentially by surface tension whereas in the second procedure gravity opposes the circumferential spreading of the melted plastic. Thus a patch produced by the second procedure tends to be slightly narrower than a patch produced by the first procedure and its longitudinal edges tend to be tapered to lesser degree. In addition a patch produced by the second procedure may be slightly thicker along the longitudinal midline of the patch. For some installations the configuration produced by the second procedure is especially desirable for sealing action.

A feature of the invention is that the circumferential cross-sectional configuration of the patch may be controlled between the two extremes of the first and second procedures by simply rotating the bolt 180° in the cradle cavity 32 at a selected time in the prequench period. Thus, gravity opposes the tendency of the melted plastic to spread circumferentially by surface tension during the first part of the prequench period and gravity enforces the tendency of the melted plastic to spread circumferentially during the latter part of the prequench period.

It has been found that both applying a crystallizable thermoplastic polymer, e.g., a poly(alkylene phthalate), to a screw fastener and by incorporating a metal powder, e.g., aluminum, into the patch, excellent results were obtained due, perhaps to a certain amount of metal-to-metal contact. The resulting break-away torque was increased and survived fifteen cycles of reuse. The amount of the aluminum powder may be about 5 to 40 percent by weight of the resin and best results were obtained in the range of about 15 to 20 percent by weight. Any suitable metal in finely divided form may be incorporated in a plastic patch but preferably a relatively soft metal such as aluminum or copper or a metal of intermediate hardness is employed.

In the production of a patch of a thermoplastic polymer, e.g., a poly(alkylene phthalate), the metal powder is incorporated into the polymer before it is fabricated into a sheet or strip form. As described, when metal particles are present in the thermoplastic patch material, the hardness of the metal particles is sufficient to provide increased bond strength between the patch material and the fastener. Also, the content of the metal particles is controlled such that they are present in an amount sufficient to increase the bond strength between the polymer and the fastener.

In determining whether a polymeric patch on a self-locking fastener has a substantially reduced crystallinity, as produced by the present invention, the patch may first be observed by X-ray diffraction or any equivalent means to determine whether the patch material is substantially amorphous, i.e., having a reduced crystallinity. Following the initial determination that the material is substantially amorphous, the patch material may be stripped from the fastener and its density and volume may be measured. Then, by determining the chemical composition of the polymeric patch material, the maximum crystallization shrinkage and the thermal contraction shrinkage of the polymeric material may be determined. From this information, the degree of crstallization of the patch material expressed in terms of the volumetric crystallization shrinkage may be determined. To the extent that the maximum shrinkage contraction of the polymer has been altered by the polymer manufacturer through the inclusion of additive ingredients such as fillers or plasticizers, the thermal contraction shrinkage and the crystallization shrinkage of the polymer may be determined experimentally by controlled cooling of a polymer sample or samples from the melting point through the glass transition temperature of the polymer.

In a preferred form of the invention, the polymeric thermoplastic patch material has a crystallization rate which is higher than that of a polycarbonate polymer. Polycarbonates, although suitable in the present invention, have a relatively slow rate of crystallization and do not require as rapid a cooling rate to achieve the desired reduction in the degree of crystallization of the polymeric patch material.

We claim:

1. A method of forming a thermoplastic polymeric locking element on a screw-threaded metal fastener for locking cooperation with a complementary screw thread of a complementary member, which comprises the steps of:
   a. heating the metal fastener to a temperature above the melting point of the thermoplastic polymer but below the decomposition temperature thereof;
   b. applying a crystallizable thermoplastic polymer having a slower crystallization rate than polyethylene to the screw thread of the heated fastener;
   c. melting said polymer and permitting it to flow into intimate contact with the screw thread of the fastener; and
   d. cooling the fastener to a temperature below the glass transition temperature of the polymer at a cooling rate sufficient to reduce crystallization to a crystallization shrinkage of about 25 percent or less of the polymer's maximum volumetric crystallization shrinkage.

2. A method as set forth in claim 1, wherein said thermoplastic is a poly(alkylene phthalate) having the general formula wherein $x$ is an integer from 2 to 10, $n$ is an integer of a magnitude sufficient to produce a molecular weight of at least 10,000, and Ar is 3. A method as set forth in claim 2, wherein said poly(alkylene phthalate) is poly(ethylene terephthalate).

4. A method as set forth in claim 2 in which said thermoplastic is applied to the fastener in the form of a film.

5. A method as set forth in claim 4, in which the film is poly (ethylene phthalate).

6. The method of claim 1, wherein said crystallizable polymer is applied in the form of a solid film to the screw of said fastener.

7. A method as set forth in claim 1 in which the step of applying the polymer to the fastener includes: applying the polymer in the form of a film, curving said film laterally to the peripheral curvature of the fastener, and pressing the film against the fastener to cause the screw thread of the fastener to penetrate the film sufficiently to fix the position of the film relative to the fastener to cause the material of the film to melt and flow into the valleys of the screw thread of the fastener.

8. A method as set forth in claim 7 in which the film is pressed across the upper side of the fastener while the fastener is in reclining position so that gravity promotes the spreading of the melted polymer circumferentially of the fastener to cause the polymeric locking element to taper in thickness towards its opposite longitudinal edges.

9. A method as set forth in claim 7 in which the film is positioned across the underside of the fastener such that gravity opposes the tendency of the melted polymer to spread circumferentially of the fastener and the width of the polymeric locking element is thereby narrow and tends to increase in thickness along its longitudinal midline.

10. A method as set forth in claim 7 in which said polymeric material is applied to the fastener with the steps of:

tacking the film to the fastener by pressing the film laterally of the fastener and pressing the film against the fastener briefly to cause the crests of the screw thread of the fastener to melt the material of the film locally and to penetrate partially through the thickness of the film to cause the film to adhere to the crests of the screw thread; and terminating the pressure while the film is still at least partially solid and then permitting the heated fastener to completely melt the film to cause the melted polymer to enter the valleys of the screw thread.

11. A method as set forth in claim 10 in which the film is tacked to the upper side of the fastener while the fastener is in reclining position.

12. A method as set forth in claim 10 in which the film is tacked to the underside of the fastener while the fastener is in reclining position.

13. A method as set forth in claim 10 in which the film is tacked to the underside of the fastener while the fsatener is in reclining position and which includes the step of rotating the fastener on its axis to place the film on the upper side of the fastener while a substantial portion of the film is solid, whereby prior to the rotation step gravity opposes the spreading of the melted polymer circumferentially of the fastener and after the rotation step gravity promotes the spreading of the melted polymer circumferentially of the fastener with the final configuration of the locking element being influenced by the timing of the rotation step.

14. A method as set forth in claim 4 in which the step of applying the polyester to the screw thread of the heated fastener includes:

shaping the film to the transverse curvature of the heated fastener;

pressing the film to cause the crests of the screw thread to penetrate the film across the full width of the film with consequent local melting of the material of the film along the regions of the crests of the screw thread;

and permitting the heated fastener to continue to heat the film until the polymer melts to wet the adjacent surfaces of the screw thread and to form pools in the valleys of the screw thread.

15. A method as set forth in claim 14, which includes the step of incorporating finely divided metal particles in the polymer before it is formed into a film, said metal particles having a hardness and being present in an amount sufficient to increase the bond strength between said polymer and said fastener.

16. A method as set forth in claim 15, in which said metal has a hardness which includes aluminum and copper and metals having a hardness intermediate to that of aluminum and copper.

17. A method as set forth in claim 15, in which the metal particles comprise 5 to 40 percent by weight of the polymer.

18. A method as set forth in claim 15, in which the metal particles comprise 10 to 30 percent by weight of the polymer.

19. A method as set forth in claim 2, in which the metal fastener is heated to a temperature in excess of 600° F.

20. A method as set forth in claim 2, in which the metal fastener is heated to a temperature in the range of 700° to 850°F.

21. A method as set forth in claim 2, in which the cooling step is carried out by quenching the heated fastener in water.

22. A method as set forth in claim 21, in which the temperature of the water is in the range of 32° to 212° F.

23. A method as set forth in claim 1, in which the cooling step is carried out by quenching the heated fastener in a silicone oil having a temperature which may be as low as about −78.5° C.

24. A method as set forth in claim 1 in which the molten polymer is permitted to flow in intimate contact with the screw thread of the fastener for about 15 to about 135 seconds.

25. A method as set forth in claim 3, in which the metal fastener is heated to a temperature in the range of about 580° to about 850° F.

26. A method as set forth in claim 25, in which the cooling step is carried out by quenching the heated fastener in water at a temperature of about 70° F.

27. A method as set forth in claim 1, in which the metal fastener is heated to a temperature in the range of about 100° to about 300° F. above the melting point of said thermoplastic polymer.

28. A method as set forth in claim 7, in which the thickness of said film is within the range of about 0.005 inch to about 0.020 inch.

29. A method as set forth in claim 1 wherein said polymer has a maximum volumetric shrinkage of crystallization of about 3 percent or greater.

30. A method as set forth in claim 1 wherein said polymer has a maximum volumetric shrinkage of crystallization of about 5 to about 15 percent.

31. In a method of manufacturing a self-locking metal screw threaded fastener for locking cooperation with a complementary screw thread of a complementary member, wherein the self-locking characteristic is derived from a locking element on a minor portion of the screw thread, including the steps of heating the metal fastener to a temperature above the melting point of the thermoplastic polymer but below the decomposition temperature thereof; the improvement which comprises:

a. applying a crystallizable polymer having a slower crystallization rate than polyethylene to the screw thread of the heated fastener, b. melting said polymer and permitting it to flow into intimate contact with the screw thread of the fastener, c. cooling the fastener and polymer to a temperature below the glass transition temperature of the polymer at a cooling rate sufficient to reduce crystallization to a crystallization shrinkage of about 25 percent or less of the polymer's maximum crystallization volumetric shrinkage.

32. In a method of forming a thermoplastic polymeric locking element on a screw threaded metal fastener for locking cooperation by the fastener with a complementary screw thread of a complementary member, the improvement comprising the steps of:

a. coating the fastener with a protective material to minimize corrosion of the fastener during storage and handling prior to the application of the polymer, the protective material being of the type that is largely dissipated at elevated temperatures;

b. heating the coated fastener to a temperature above the melting point of a selected polymer to largely dissipate said coating with the temperature being sufficiently high to melt the polymer;

c. applying a film of the said polymer to the screw thread of the heated fastener to cause the polymer to be melted by the fastener into intimate contact with the fastener; and d. rapidly cooling the fastener and polymer to solidify the polymer into a film in intimate bond with the fastener with numerous small bubbles entrained in the polymer.

33. An improvement as set forth in claim 32 in which the protective material is an oil.

34. A method of forming a threaded fastener having self-locking characteristics by reason of a patch of a thermoplastic polymer adhered to a plurality of unmodified threads of the fastener comprising the steps of:

heating a threaded fastener to a temperature in excess of the flow point temperature of the polymer;

providing a flat ribbon of a preselected thickness of the polymer having a predetermined length and of a width less than 90° of the circumferential extent relative to the threads of the fastener;

placing the said flat ribbon of the polymer on the heated fastener at a preselected location thereon and simultaneously pressurely shaping the said flat ribbon to the circumference of the major diameter of the threads with sufficient work shaping pressure to hold said ribbon about the circumference of the major diameter of the threads and against longitudinal and radial movement relative to said threads for a time sufficient to cause the heated crest of the threads engaged with the ribbon to sever the ribbon into discreet segments whereby accurate predetermined quantities of the polymer formed by the discreet segments melt and flow into the valleys between adjacent crests of the threads to bond to adjacent flanks of the threads to form a unitary cohesive patch of solid material bonded to the threads of the fastener at the said preselected location thereof.

35. The method of claim 34 wherein said polymer is a polyester.

36. The method of claim 34 wherein said polymer has a width substantially less than 90° of the circumferential extent relative to the threads of the fastener.

37. A method of producing a self-locking threaded fastener wherein the thread is of standard form and the self-locking characteristic is derived from a patch of thermoplastic polymeric material directly bonded to the threads of the fastener, which method comprises:

heating the fastener to a temperature in excess of the melting temperature of the thermoplastic material;

forming a flat ribbon of the said plastic material of a predetermined thickness having a length equal to at least the distance of three thread convolutions and of a width less than the circumference of the major diameter of the threads;

applying the said ribbon the the heated fastener at a preselected location thereon by a pressure applying tool substantially conforming to the major diameter of the threads to work shape the ribbon to the major diameter of the engaged threads and to hold said ribbon, as the material thereof melts, against longitudinal and radial movement relative to said threads, whereby a predetermined quantity of the plastic flows into each valley of adjacent threads engaged by said ribbon to form a patch of the plastic bonded to the unmodified surfaces of the threads and gradually merging at its boundary edge portions into such surfaces of the thread; and after said material has flowed downwardly of the crests of the threads and into the valleys of the latter to bond to the threads at said preselected locations, quickly cooling the fastener to solidify the material.

38. A method of forming a threaded fastener having self-locking characteristics by reason of a patch of thermoplastic polymer adhered to a preselected plurality of unmodified threads of the fastener comprising the steps of:

heating a threaded fastener to a temperature in excess of the flow point temperature of the polymer;

providing a flat ribbon of a preselected thickness of the polymer having a predetermined length and of a width less than the circumference of the major diameter of the threads of the fastener;

placing the said flat ribbon of the polymer on the heated fastener at a preselected location thereon and simultaneously pressurely shaping the said flat ribbon to the circumference of the major diameter of the threads with sufficient work shaping pressure to hold said ribbon against longitudinal and radial movement relative to said threads for a time sufficient to cause an amount of the polymer determined by the longitudinal extent of the ribbon between adjacent crests of the threads, to flow into each valley of adjacent threads engaged with said ribbon and outwardly of the ribbon to form a unitary cohesive patch of the polymer bonded to the threads of the fastener at the preselected location thereon; and promptly thereafter abruptly cooling the fastener to solidify the polymer.

39. The method of claim 38 wherein said polymer is a polyester.

40. The method of claim 1 wherein said polymer has a crystallization rate that is higher than the crystallization rate of a polycarbonate polymer.

41. The method of claim 31 wherein said polymer has a crystallization rate that is higher than the crystallization rate of a polycarbonate polymer.

42. A method of forming a thermoplastic polymeric locking element on a screw-threaded metal fastener for locking cooperation with a complementary screw thread of a complementary member, which comprises the steps of:

a. heating the metal fastener to a temperature above the melting point of the thermoplastic polymer but below the decomposition temperature thereof;

b. applying a crystallizable thermoplastic poly (alkylene phthalate) polymer to the screw thread of the heated fastener, said polymer having the formula wherein x is an integer from 2 to 10, n is an integer of a magnitude sufficient to produce a molecular weight of at least 10,000, and Ar is c. melting said polymer and permitting it to flow into intimate contact with the screw thread of the fastener; and d. cooling the fastener to a temperature below the glass transition temperature of the polymer by quenching the fastener at a temperature ranging from about −78.5° C. to 212° F.

43. A method as set forth in claim 42 wherein the fastener is quenched at a temperature of 32° to 212° F.

44. A method as set forth in claim 43 wherein the quenching medium is water.

45. A method as set forth in claim 42 in which the metal fastener is heated to a temperature in excess of 600° F.

46. A method as set forth in claim 42 in which the metal fastener is heated to a temperature in the range of 700° to 850°F.

47. A method of forming a thermoplastic polymeric locking element on a screw-threaded metal fastener for locking cooperation with a complementary screw thread of a complementary member, which comprises the steps of:

a. heating the metal fastener to a temperature above the melting point of the thermoplastic polymer but below the decomposition temperature thereof;

b. applying a crystallizable poly(ethylene terephthalate) thermoplastic polymer to the screw thread of the heated fastener;

c. melting said polymer and permitting it to flow into intimate contact with the screw thread of the fastener; and d. cooling the fastener to a temperature below the glass transition temperature of the polymer by quenching the fastener at a temperature ranging from about −78.5° C. to 212° F.

48. A method as set forth in claim 47 wherein the fastener is quenched at a temperature of 32° to 212° F.

49. A method as set forth in claim 48 wherein the quenching medium is water.

50. A method as set forth in claim 47 in which the metal fastener is heated to a temperature in excess of 600° F.

51. A method as set forth in claim 47 in which the metal fastener is heated to a temperature in the range of 700° to 850° F.

52. A method of forming a threaded fastener having self-locking characteristics by reason of a patch of thermoplastic material adhered to a preselected plurality of unmodified threads of the fastener comprising the steps of:

heating at least a preselected portion of a threaded fastener to a temperature in excess of the melting point of the thermoplastic material, but below the decomposition temperature thereof; and applying a blank of said thermoplastic material to the fastener at the preselected portion thereof for a period of time sufficient to cause the material of said blank to melt and in a molten state to flow into valleys of adjacent threads at the preselected location to bond to adjacent flanks of the threads defining the valleys to form a unitary cohesive patch of solid material at said preselected location.

53. A method as claimed in claim 52 in which the fastener is abruptly cooled to solidify the material after said material in a molten state has flowed into and wet the valleys of adjacent threads.

54. A method of forming a threaded fastener having self-locking characteristics by reason of a patch of a thermoplastic material adhered to a plurality of unmodified threads of the fastener comprising the steps of:

heating a threaded fastener to a temperature in excess of the melting point of the material;

providing at least one blank of said material having a preselected thickness and length and a width less than 90° of the circumferential extent relative to the threads of the fastener;

placing the said blank of the thermoplastic material on the heated fastener at a preselected location thereon and simultaneously pressurely shaping the said blank to the circumference of the major diameter of the threads with sufficient work shaping pressure to hold said blank about the circumference of the major diameter of the threads and against longitudinal and radial movement relative to said threads for a time sufficient to cause the heated crest of the threads engaged with the blank to separate the blank into segments whereby accurate predetermined quantities of the material of the segments melts and flows into the valleys between adjacent crests of the threads to bond to adjacent flanks of the threads to form a unitary cohesive patch of solid material bonded to the threads of the fastener at the said preselected location thereof.

55. A method of forming a threaded fastener having self-locking characteristics by reason of a patch of thermoplastic material adhered to a preselected plurality of unmodified threads of the fastener comprising the steps of:

heating a threaded fastener to a temperature in excess of the flow point temperature of the material;

providing a flat ribbon of a preselected thickness of the material having a predetermined length and of a width less than the circumference of the major diameter of the threads of the fastener;

placing the said flat ribbon on the heated fastener at a preselected location thereon and simultaneously pressurely shaping the said flat ribbon to the circumference of the major diameter of the threads with sufficient work shaping pressure to hold said ribbon against longitudinal and radial movement relative to said threads for a time sufficient to cause the crests of said threads to thermally divide said ribbons into segments determined by the longitudinal extent of the ribbon between adjacent crests of the threads, whereby said segments thereafter melt and in a molten state flow into and wet each valley of adjacent threads engaged with said ribbon to form a unitary cohesive patch of the material bonded to the threads of the fastener at the preselected location thereon; and promptly thereafter abruptly cooling the fastener to solidify the material.

56. A method of forming a threaded fastener having predetermined self-locking characteristics by reason of a patch of a thermoplastic material adhered to a plurality of unmodified threads of the fastener comprising the steps of:

heating at least a preselected portion of a threaded fastener to a temperature in excess of the melting point of the material;

providing at least one blank of the thermoplastic material of a geometrical size and shape preselected in relation to the predetermined self-locking characteristics of the fastener;

placing the said blank of the thermoplastic material on the fastener at the preselected location thereon and simultaneously pressurely shaping the said blank to the circumference of the major diameter of the threads with sufficient work shaping pressure to hold said blank about the circumference of the major diameter of the threads and against longitudinal and radial movement relative to said threads for a time sufficient to cause the heated crests of the threads engaged with the blank to melt the material of the blank engaged by the crests of the threads at spaced points along the blank, and allowing the blank to remain in engagement with the threads whereby accurate predetermined quantities of the material of the blank intermediate the crests of the threads, melts and flows into the valleys between adjacent crests of the threads to bond to adjacent flanks of the threads to form a unitary cohesive patch of solid material bonded to the threads of the fastener at the said preselected location thereof.

57. A method of forming a threaded fastener having self-locking characteristics, by reason of a patch of thermoplastic material with well-defined and predetermined dimensional characteristics, adhered to a well-defined and preselected plurality of unmodified threads of the fastener, comprising the steps of:

heating a threaded fastener to a temperature in excess of the melting point of the thermoplastic material, but below the decomposition temperature thereof;

applying a discrete blank of said thermoplastic material having predetermined and stable dimensions to the crests of the threads of the heated fastener at a preselected location thereon, for a period of time sufficient to cause the heat from the crests of the threads to soften the material of said blank, permitting it to separate into multiple discrete segments separated by the threads of the fastener, which segments then melt and in a molten state flow into the individual valleys of adjacent threads at the preselected location, to adhere to the adjacent flanks of the threads defining the valleys, to form a unitary cohesive patch made up of multiple discrete segments of solid material at said preselected location.

58. The method of claim 53 wherein the fastener and molten thermoplastic material are abruptly cooled in a liquid quench medium having a temperature substantially less than the temperature of the fastener.

* * * * *